ns of Pennsylvania
No Drawing. Filed May 13, 1964, Ser. No. 367,229
12 Claims. (Cl. 260—471)

ABSTRACT OF THE DISCLOSURE 3,5 - diiodo - 4 - (5,6,7,8 - tetrahydro-4-alkoxynaphthoxy)phenyl alkanoic acids and certain salts thereof are disclosed as having hypocholesterolemic properties. These are prepared by treating an ester of a 3,5-dinitro-4-hydroxyphenyl alkanoic acid with a 1-hydroxy-4-alkoxy-5,6,7,8-tetrahydronaphthalene to give a corresponding condensation product, which is reduced, tetrazotized, and iodized to yield the corresponding alkanoate.

This invention relates to novel organic compounds having useful biological properties. More specifically, it relates to compounds found to lower serum cholesterol levels without concomitant calorigenic properties. In another aspect, it relates to tetrahydronaphthoxy substituted phenyl alkanoic acids.

The novel chemical compounds of this invention are represented by the following structural formula:

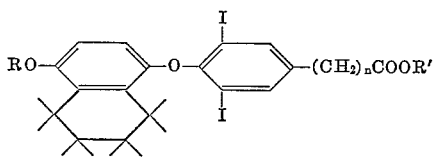

Formula I wherein both R and R' represent hydrogen, lower alkyl having 1 to 3 carbon atoms, or dialkylaminoalkyl; and $n$ is a positive integer from 0 to 3.

The preferred compounds are represented by Formula I when $n$ is one. The preferred and advantageous compound of this invention is represented by Formula I further when R and R' are both hydrogen.

Of particular utility as intermediates in the preparation of the above-described novel compounds of Formula I, are their novel dinitro analogues, represented by the following structural formula:

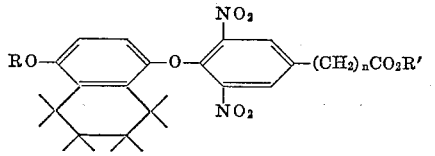

Formula II wherein both R and R' represent lower alkyl having from 1 to 3 carbon atoms; and $n$ is a positive integer from 0 to 3.

The invention also includes within its scope the pharmaceutically acceptable non-toxic salts of the above defined acids, which are formed from non-toxic organic and inorganic bases. Such salts are easily prepared by methods known to the art. The acid is reacted with either the calculated amount of organic or inorganic base in aqueous miscible solvent, such as acetone or ethanol, with isolation of the salt by concentration and cooling, or by treatment of the acid with an excess of the base in an aqueous immiscible solvent, such as ethyl ether or chloroform, the desired salt thereby separating directly. Any salt whose cation is non-toxic, pharmaceutically acceptable and stable may be formed, such as the ammonium, trimethylamine or other nitrogen containing salts, but the alkali metal salts are preferred, especially the sodium and potassium salts. These salts are formed by reaction of the acids with the hydroxides such as ammonium hydroxide, sodium hydroxide or potassium hydroxide in a suitable aqueous medium. The above applies when R'=H.

The administration of the compounds of this invention may be made by any of the usual methods, preferably in the form of pharmaceutical compositions such as tablets, capsules, suspensions and the like. Also highly useful forms are sustained time release compositions which provide a substantially uniform dosage over an extended period of time.

Broadly, the novel precursors of the novel products of this invention are prepared by treating an ester of a 3,5-dinitro-4-hydroxyphenyl alkanoic acid with a 1-hydroxy-4-alkoxy-5,6,7,8-tetrahydronaphthalene to give a condensation product, an ester of 3,5-dinitro-4-(5,6,7,8-tetrahydro-4-alkoxynaphthoxy)phenyl alkanoic acid, which has the following structural formula:

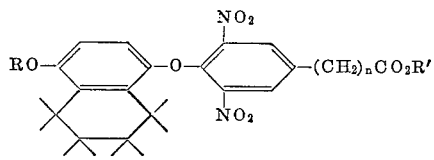

Formula II wherein both R and R' represent lower alkyl, having 1 to 3 carbon atoms, and $n$ is a positive integer from 0 to 3.

A compound of Formula II is reduced, tetrazotized, and treated with iodine to yield the corresponding diiodophenyl alkanoate, the latter having the following structural formula:

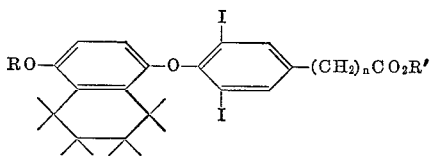

Formula I wherein both R and R' represent lower alkyl, and $n$ is a positive integer from 0 to 3.

Compounds of the structure of Formula II and I may readily be converted to the analogues wherein R and R' are hydrogen and dialkylaminoalkyl. In the instance of the hydrogen analogue, i.e., R and R' are hydrogen, this is accomplished by halogen acid hydrolysis, for example with hydriodic acid. In the instance where R and R' are dialkylaminoalkyl, the compounds which are their hydrogen analogues are treated generally as follows: Starting with a compound of Formula I, wherein R=R'=H, it is converted to an alkyl ester, treated with sodium methoxide and dialkylaminoalkyl halide to give another compound of Formula I, wherein R=dialkylaminoalkyl and R'=alkyl. This latter compound is hydrolyzed with acid or base to give another compound of Formula I, wherein R=dialkylaminoalkyl and R'=H.

The resulting basic ether is treated with dialkylaminoalkanol and dicyclohexylcarbodiimide to give the desired basic ester ether, wherein R=R'=dialkylaminoalkyl.

The following examples will further serve to typify this invention, but these examples are not to be construed as limiting the scope of this invention which is defined by the foregoing disclosure and appended claims.

EXAMPLE 1

Preparation of ethyl-3,5-dinitro-4-(5,6,7,8-tetrahydro-4-methoxynaphthoxy)phenyl acetate of the structural Formula II A mixture of 10.0 g. of ethyl-3,5-dinitro-4-hydroxyphenylacetate, 7.3 g. of p-toluenesulfonyl chloride and 35 ml. of dry pyridine is heated on a steam bath for 10 minutes. Then 3.4 g. of 1-hydroxy-4-methoxy-5,6,7,8-tetrahydronaphthalene [R. B. Thompson and J. A. Chenicek, Ind. Eng. Chem., 47, 1431 (1955)], is added and the dark mixture is refluxed for 1½ hours. The pyridine is then removed in vacuo, and the residue is positioned between benzene and water. The benzene layer is washed with dilute hydrochloric acid, water, 10% sodium hydroxide solution, and finally water. After drying over sodium sulfate, the solvent is removed in vacuo and the residue is recrystallized from 95% ethanol (Darco) to give 3.8 g. of the product, M.P. 94–96° C.

EXAMPLE 2

Preparation of ethyl-3,5-diiodo-4-(5,6,7,8-tetrahydro-4-methoxynaphthoxy)phenylacetate of the structural Formula I In a pressure bottle there is placed 3.6 g. of the dinitro compound of Example 1, 0.75 g. of 10% palladium-on-carbon, and 80 ml. of glacial acetic acid. The mixture is shaken on a Parr apparatus under an initial hydrogen pressure of 45 p.s.i. The theoretical amount of hydrogen is absorbed in about 15 minutes and the suspension is filtered through Supercel. The filtrate is added dropwise at −5 to 0° C. to a nitrosyl sulfuric acid mixture, made by slowly adding 4.18 g. of sodium nitrite to a mixture of 40 ml. of acetic acid and 125 ml. of sulfuric acid at 60–70° C. The mixture is stirred an additional hour at 0° C. after the previous addition is completed, and poured in portions into a mixture of 17.6 g. of sodium iodide, 280 ml. of water, 14.2 g. of iodine, 250 ml. of chloroform and 3.0 g. of urea. Stirring is continued at room temperature for 2 hours. The mixture is diluted with a liter of water, and the chloroform layer is separated. The aqueous layer is extracted several times with chloroform and the combined extracts are washed with 10% sodium bisulfite solution, water, 5% sodium bicarbonate solution and again with water. The chloroform solution is dried over calcium chloride, and the solvent is removed in vacuo leaving a residue of 4.4 g. of crude product. This crude product is dissolved in a small volume of benzene and chromatographed over Woelm acid-washed alumina, using 10% methanol in benzene as the eluent, and collecting the first fractions off the column. These were evaporated and the residue was recrystallized from aqueous ethanol. Thus is obtained the diiodo product, M.P. 77–80° C.

EXAMPLE 3

Preparation of 3,5-diiodo-4-(5,6,7,8-tetrahydro-4-hydroxy naphthoxy)phenyl acetic acid of the structural Formula I A suspension of 2.5 g. of the diiodo compound of Example 2, 25 ml. of 47% hydriodic acid, and 40 ml. of glacial acetic acid is refluxed for 6 hours. The solution is cooled and poured into 3 volumes of ice-water. The solid is filtered, washed with water, and dried to give 2.2 g. of a solid, M.P. about 130° C. This is recrystallized from benzene then from ethyl acetate-petroleum ether to give the acid product, M.P. 218–219° C.

EXAMPLE 4

Preparation of β-diethylaminoethyl-3,5-diiodo-4-(5,6,7,8-tetrahydro-4-hydroxynaphthoxy)phenyl acetate hydrochloride The resulting acid of Example 3 in dry 2-propanol is refluxed for 4 hours in the presence of a slight molar excess of β-diethylaminoethyl chloride. The reaction mixture is cooled and the amino ester hydrochloride is filtered and washed with ether. In some cases it is necessary to dilute the reaction mixture with ether or petroleum ether to ensure complete precipitation of the product. Further purification is effected by recrystallization.

EXAMPLE 5

Preparation of 3,5-diiodo-4-(4-β-diethylaminoethoxy-5,6,7,8-tetrahydronaphthoxy)phenyl acetic acid The resulting acid of Example 3 (0.01 mole) in 150 ml. of absolute ethanol is cooled and saturated with dry hydrogen chloride. The excess alcohol is removed by distillation and the residual novel ester, ethyl-3,5-diiodo-4-(5,6,7,8 - tetrahydronaphthoxy-4-hydroxy)phenyl acetate, is used without further purification.

A mixture of 4 millimoles of this ester and 4 millimoles of sodium methoxide in 10 ml. of absolute ethanol is stirred for 30 minutes at room temperature. To the stirred mixture is added a solution of 4.1 millimoles of β-diethylaminoethyl chloride in 8 ml. of dry toluene. The mixture is refluxed for 3 hours and left at room temperature overnight. The precipitated sodium chloride is removed by filtration and the filtrate is evaporated in vacuo. The residue can be treated with ethereal hydrogen chloride to precipitate the hydrochloride of the diethylaminoethyl ether ester of Formula I or can be hydrolyzed directly with acid or base to the desired basic ether acid of Formula I, 3,5-diiodo-4-(4-β-diethylaminoethoxy-5,6,7,8-tetrahydronaphthoxy)phenylacetic acid.

EXAMPLE 6

Preparation of β - diethylaminoethyl - 3,5 - diiodo - 4 - (4-β-diethylaminoethoxy - 5,6,7,8 - tetrahydronaphthoxy)-phenyl acetate dihydrochloride The acetic acid prepared in Example 5 is dissolved in dry tetrahydrofuran and to it is added an equivalent amount of dicyclohexylcarbodiimide and a slight molar excess of β-diethylaminoethanol. The reaction is allowed to stir at room temperature overnight and is then diluted with ether. The precipitated dicyclohexylurea is filtered and the filtrate is treated with gaseous hydrogen chloride to precipitate the dihydrochloride of the product, β-diethylaminoethyl-3,5-diiodo-4-(4-β-diethylaminoethoxy - 5,6,7,8-tetrahydronaphthoxy)phenyl acetate dihydrochloride.

What is claimed is:

1. A chemical compound of the formula:

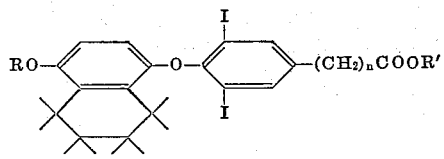

wherein
 n is a positive integer from 0 to 3, and
 R and R' are selected from the group consisting of hydrogen, lower alkyl having 1 to 3 carbon atoms and dialkylaminoalkyl.

2. A chemical compound of the formula:

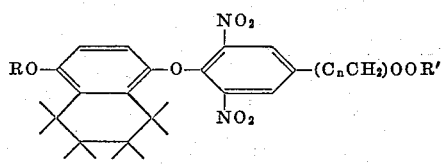

wherein
 n is a positive integer from 0 to 3, and
 R and R' are selected from the group consisting of hydrogen, lower alkyl having 1 to 3 carbon atoms and dialkylaminoalkyl.

3. A chemical compound of the formula:

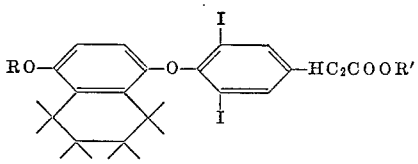

wherein R and R' are selected from the group consisting of hydrogen, lower alkyl having 1 to 3 carbon atoms and dialkylaminoalkyl.

4. 3,5-diiodo - 4 - (5,6,7,8 - tetrahydro - 4 - hydroxynaphthoxy)phenyl acetic acid.

5. Ethyl-3,5-diiodo-4-(5,6,7,8-tetrahydro - 4 - methoxynaphthoxy)phenyl acetate.

6. Ethyl-3,5-dinitro-4-(5,6,7,8-tetrahydro - 4 - methoxynaphthoxy)phenyl acetate.

7. β-Diethylaminoethyl - 3,5 - diiodo - 4 - (5,6,7,8-tetrahydro-4-hydroxynaphthoxy)phenyl acetate.

8. 3,5-diiodo - 4 - (4 - β - diethylaminoethoxy - 5,6,7,8-tetrahydronaphthoxy)phenyl acetic acid.

9. Ethyl-3,5-diiodo-4-(4-β-diethylaminoethoxy - 5,6,7,8-tetrahydronaphthoxy)phenyl acetic acid.

10. β-Diethylaminoethyl - 3,5 - diiodo - 4 - (4-β-diethylaminoethoxy-5,6,7,8-tetrahydronaphthoxy)phenyl acetate dihydrochloride.

11. Ethyl - 3,5 - diiodo-4-(5,6,7,8-tetrahydronaphthoxy-4-hydroxy)phenyl acetate.

12. The alkali metal salt of the acid defined by claim 4.

References Cited

UNITED STATES PATENTS 3,210,413   10/1965   Blank et al. _____ 260—473

LORRAINE A. WEINBERGER, *Primary Examiner.*

L. THAXTON, *Assistant Examiner.*